(12) United States Patent  
Ulrich et al.

(10) Patent No.: US 12,509,088 B1
(45) Date of Patent: Dec. 30, 2025

(54) SYSTEM AND METHOD FOR FLUID CIRCUIT CONTROL

(71) Applicant: SCOUT MOTORS INC., Tysons, VA (US)

(72) Inventors: Markus Ulrich, Township, MI (US); Sven Schmalzrieth, Township, MI (US); Bill Guglielmo, Ann Arbor, MI (US)

(73) Assignee: SCOUT MOTORS INC., Tysons, VA (US)

( * ) Notice: Subject to any disclaimer, the term of this patent is extended or adjusted under 35 U.S.C. 154(b) by 0 days.

(21) Appl. No.: 19/214,420

(22) Filed: May 21, 2025

(51) Int. Cl.
| | |
|---|---|
| *B60W 10/06* | (2006.01) |
| *B60G 11/26* | (2006.01) |
| *B60G 13/08* | (2006.01) |
| *B60G 17/0195* | (2006.01) |
| *B60G 99/00* | (2010.01) |

(Continued)

(52) U.S. Cl.
CPC ....... *B60W 30/1843* (2013.01); *B60G 11/265* (2013.01); *B60G 13/08* (2013.01); *B60G 17/0195* (2013.01); *B60G 99/008* (2013.01); *B60W 10/06* (2013.01); *B60W 10/22* (2013.01); *B60G 2202/24* (2013.01); *B60G 2400/5182* (2013.01); *B60G 2400/732* (2013.01); *B60G 2500/10* (2013.01); *B60W 2510/0638* (2013.01); *B60W 2510/0676* (2013.01)

(58) Field of Classification Search
CPC ........... B60W 30/184; B60W 30/1843; B60W 10/06; B60W 10/22; B60W 2510/0638; B60W 2510/0676; B60G 11/26; B60G 11/265; B60G 13/00; B60G 13/02; B60G 13/06; B60G 13/08; B60G 15/00; B60G 15/06; B60G 15/061; B60G 15/062; B60G 15/08; B60G 15/12; B60G 17/00; B60G 17/002; B60G 17/015; B60G 17/0195; B60G 17/04; B60G 17/06; B60G 17/08; B60G 21/06; B60G 21/073; B60G 99/008; B60G 2202/15; B60G 2202/20; B60G 2202/24; B60G 2202/30; B60G 2202/322; B60G 2206/40; B60G 2206/41; B60G 2400/5122; B60G 2400/5182; B60G 2400/73; B60G 2400/732; B60G 2500/10
USPC ........... 280/124.157, 124.16, 124.161, 5.515
See application file for complete search history.

(56) References Cited

U.S. PATENT DOCUMENTS

| | | | | |
|---|---|---|---|---|
| 2,140,767 | A * | 12/1938 | Sanford | B60G 17/08 188/266.5 |
| 5,097,916 | A * | 3/1992 | Brandstadter | B60G 17/04 180/41 |
| 2021/0300472 | A1* | 9/2021 | Thomas | B62D 21/11 |

FOREIGN PATENT DOCUMENTS

DE      102023107610 A1 * 10/2024 ......... B60G 17/0152

* cited by examiner

*Primary Examiner* — Keith J Frisby
(74) *Attorney, Agent, or Firm* — ALSTON & BIRD LLP

(57) ABSTRACT

Provided herein is an apparatus and system including a fluid control system for suspension control that is also employed to circulate lubricating oil for an internal combustion engine. A vehicle may include a fluid pump that includes at least two distinct pump circuits, namely, a first distinct pump circuit and a second distinct pump circuit; a valve control block; and at least one fluid damped suspension damper. The first distinct pump circuit of the fluid pump is in fluid communication with at least one fluid damped suspension damper. The second distinct pump circuit of the fluid pump is in fluid (Continued)

communication via the valve control block with an oil circulation system of an internal combustion engine.

19 Claims, 4 Drawing Sheets

(51) Int. Cl.
*B60W 10/22* (2006.01)
*B60W 30/184* (2012.01)

SYSTEM AND METHOD FOR FLUID CIRCUIT CONTROL

BACKGROUND

Vehicles, and particularly vehicles designed for off-road use, are often equipped with off-road suspension systems. Off-road suspension systems are generally characterized by longer suspension travel ranges from a full extension to full compression and are often adjustable in terms of travel range, stiffness of the spring rate and damping. This off-road suspension is designed to accommodate rugged terrain often encountered off-road. The spring rates are also generally lower to better enable suspension travel as the vehicle traverses rugged terrain. Suspension systems that are well-suited for off-road use often sacrifice on-road performance as the two different travel surfaces benefit from different suspension settings and types of suspension.

Adjustable suspension systems are often employed by vehicles that need to operate on both on-road and off-road surfaces. Adjustable suspension systems are capable of adjusting suspension characteristics through changing spring rates and/or changing suspension travel ranges. Adjustable suspension can be employed to adjust vehicle handling characteristics for use in different environments and over different types of terrain. Such systems can use higher suspension travel ranges and softer spring rates for off-road travel, while using lower suspension travel ranges and firmer spring rates for on-road use. One such adjustable suspension is active damping suspension that is capable of adjusting suspension damping characteristics in real-time.

SUMMARY

A system and method are therefore provided for suspension control, and more particularly, for a fluid control system for suspension control that is also employed to circulate lubricating oil for an internal combustion engine. Embodiments provided herein include a vehicle including a fluid pump, wherein the fluid pump comprises at least two distinct pump circuits including first and second distinct pump circuits; a valve control block; and at least one fluid damped suspension damper, wherein the first distinct pump circuit of the fluid pump is in fluid communication with the at least one fluid damped suspension damper; where the second distinct pump circuit of the fluid pump is in fluid communication via the valve control block with an oil circulation system of an internal combustion engine.

According to some embodiments the fluid pump is a first fluid pump, where the at least one fluid damped suspension damper includes a first pair of fluid damped suspension dampers and a second pair of fluid damped suspension dampers, the vehicle further including: a second fluid pump, where the first fluid pump is in fluid communication with the first pair of fluid damped suspension dampers, and where the second fluid pump is in fluid communication with the second pair of fluid damped suspension dampers.

According to certain embodiments the second fluid pump includes at least two distinct pump circuits including a first distinct pump circuit and a second distinct pump circuit. The first distinct pump circuit of the second fluid pump is in fluid communication with the second pair of fluid damped suspension dampers; and the second distinct pump circuit of the second fluid pump is in fluid communication via the valve control block with the oil circulation system of the internal combustion engine. According to some embodiments the valve control block is controlled by a controller. The controller is configured to control the valve control block to provide fluid from the second distinct pump circuit of the first fluid pump to the oil circulation system of the internal combustion engine.

According to certain embodiments, the fluid control system also includes a controller configured to control the valve control block to provide fluid from the second distinct pump circuit of the second fluid pump to the oil circulation system of the internal combustion engine in response to a failure of the first fluid pump. According to some embodiments the valve control block is controlled by a controller, where the controller causes the valve control block to cease to supply fluid to the oil circulation system of the internal combustion engine in response to detecting a pressure loss in a fluid circuit.

In an embodiment in which the fluid control system includes a controller configured to control the valve control block, the controller may be configured to cause the fluid pump to change pressure in the oil circulation system of the internal combustion engine in response to a rotational speed of the internal combustion engine. In an embodiment in which the fluid control system includes a controller configured to control the valve control block, the controller may be configured to cause fluid to be circulated in the oil circulation system of the internal combustion engine in response to the internal combustion engine running and cease to circulate fluid in the oil circulation system of the internal combustion engine in response to the internal combustion engine not running.

In an embodiment in which the fluid control system includes a controller configured to control the valve control block, the controller may be configured to cause fluid to be circulated in the oil circulation system of the internal combustion engine based on a temperature of the internal combustion engine. According to certain embodiments a fluid circulated in the first distinct pump circuit is different than a fluid circulated in the second distinct pump circuit.

Certain embodiments provided herein include a fluid control system including: a first fluid pump, wherein the first fluid pump comprises at least two distinct pump circuits including first and second distinct pump circuits; a second fluid pump; a valve control block; a first pair of fluid damped suspension dampers, where the first distinct pump circuit of the first fluid pump is in fluid communication with the first pair of fluid damped suspension dampers; and a second pair of fluid damped suspension dampers, where the second fluid pump is in fluid communication with the second pair of fluid damped suspension dampers; where the second distinct pump circuit of the first fluid pump is in fluid communication via the valve control block with an oil circulation system of an internal combustion engine.

According to some embodiments the second fluid pump includes at least two distinct pump circuits including a first distinct pump circuit and a second distinct pump circuit, where the second pair of fluid damped suspension dampers are in fluid communication with the first distinct pump circuit of the second fluid pump, and where the second distinct pump circuit of the second fluid pump is in fluid communication via the valve control block with the oil circulation system of the internal combustion engine. According to certain embodiments a controller is configured to control the valve control block to provide fluid from the second distinct pump circuit of the second fluid pump to the oil circulation system of the internal combustion engine in response to a failure of the first fluid pump.

In an embodiment in which the fluid control system includes a controller configured to control the valve control block, the controller may be configured to cause the valve control block to cease to supply fluid to at least one fluid damped suspension damper or the oil circulation system of the internal combustion engine in response to detecting a pressure loss in a fluid circuit. In an embodiment in which the fluid control system includes a controller configured to control the valve control block, the controller may be configured to cause the first fluid pump to change pressure in the oil circulation system of the internal combustion engine in response to a rotational speed of the internal combustion engine.

In an embodiment in which the fluid control system includes a controller configured to control the valve control block, the controller may be configured to cause fluid to be circulated in the oil circulation system of the internal combustion engine in response to the internal combustion engine running and cease to circulate fluid in the oil circulation system of the internal combustion engine in response to the internal combustion engine not running. In an embodiment in which the fluid control system includes a controller configured to control the valve control block, the controller may be configured to cause fluid to be circulated in the oil circulation system of the internal combustion engine based on a temperature of the internal combustion engine. According to some embodiments a fluid circulated in the first distinct pump circuit is different than a fluid circulated in the second distinct pump circuit. According to certain embodiments an impeller of the first distinct pump circuit and an impeller of the second distinct pump circuit are coaxial and driven by a single pump motor.

DESCRIPTION OF THE DRAWINGS

Figure 1:
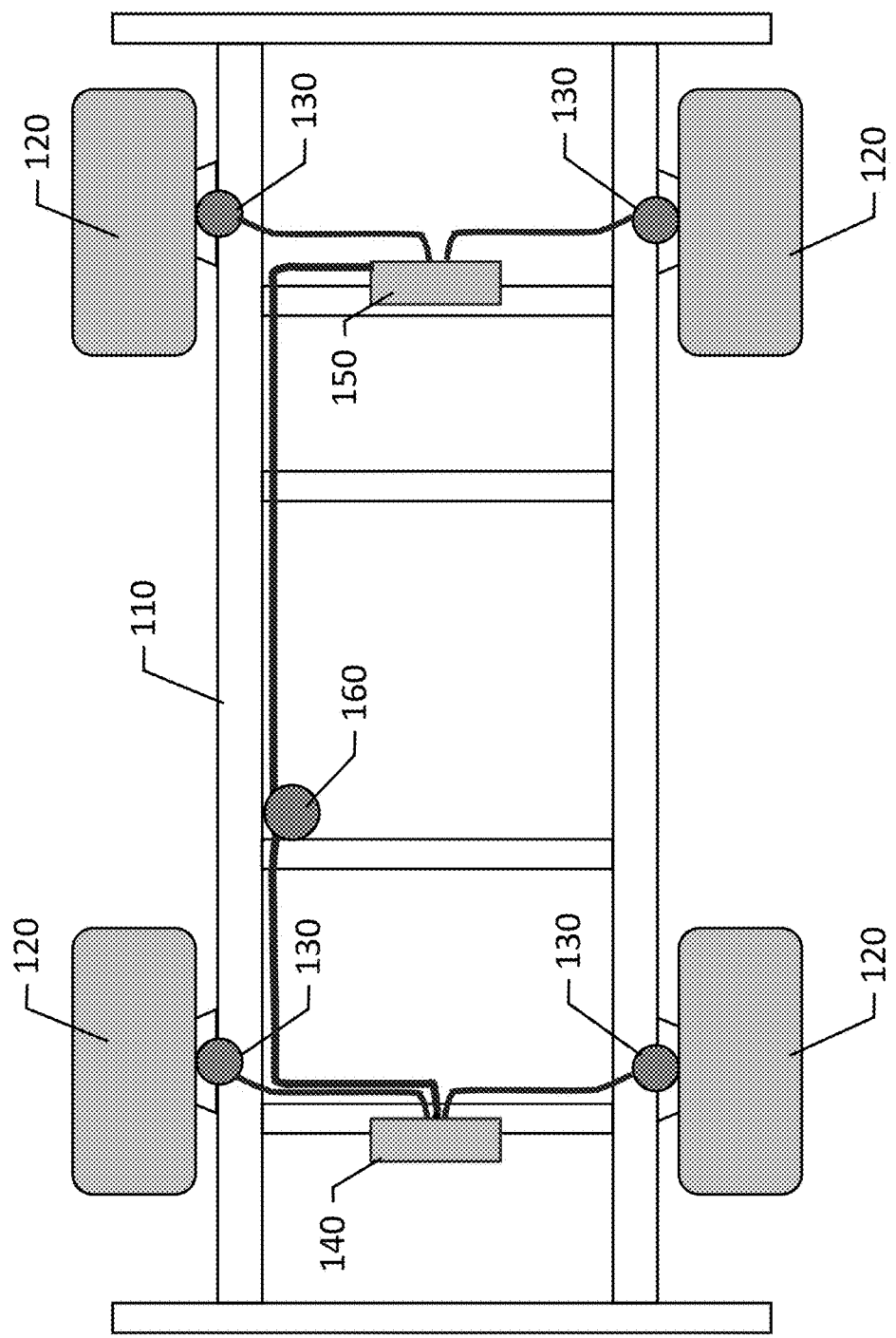
Figure 2:
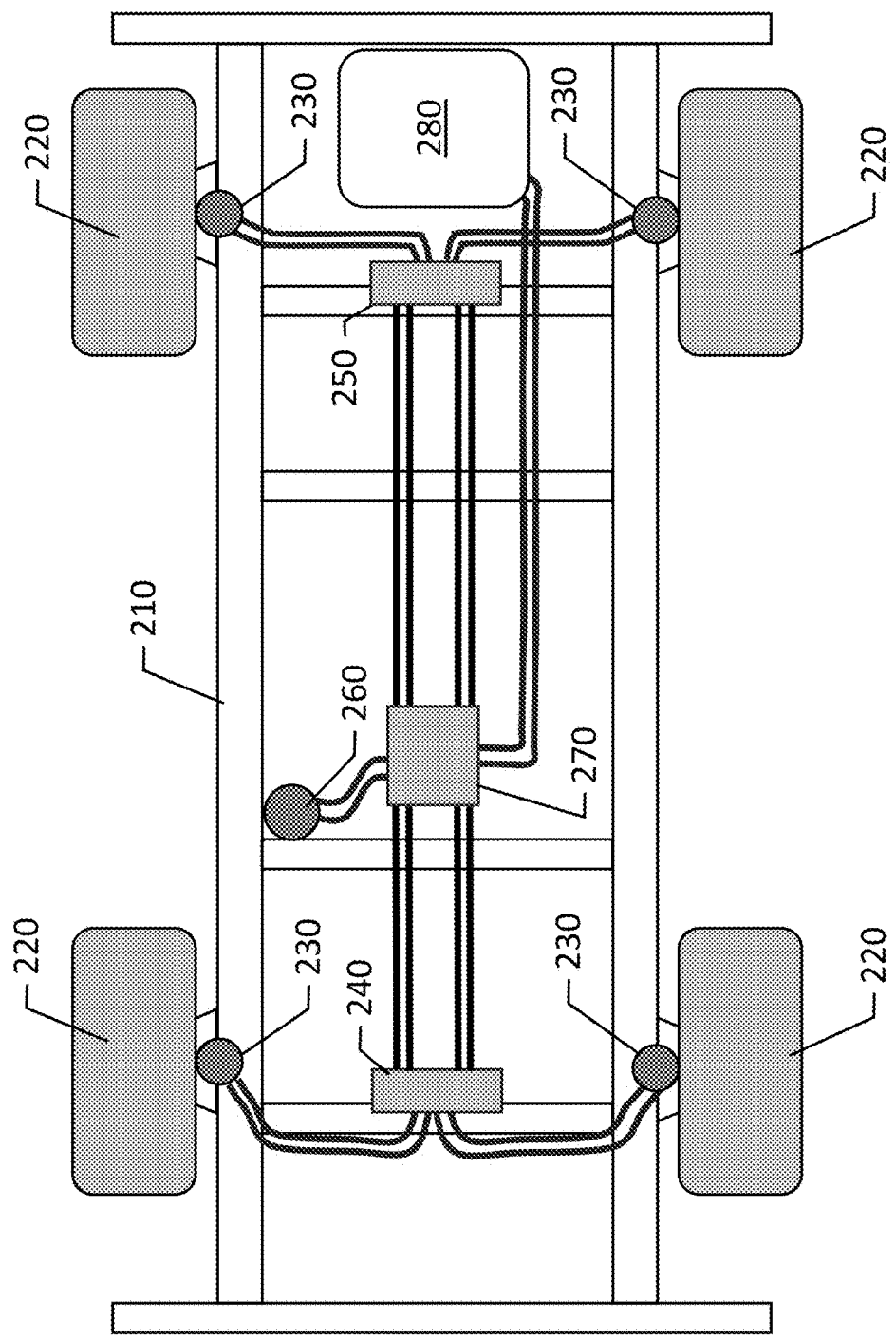
Figure 3:
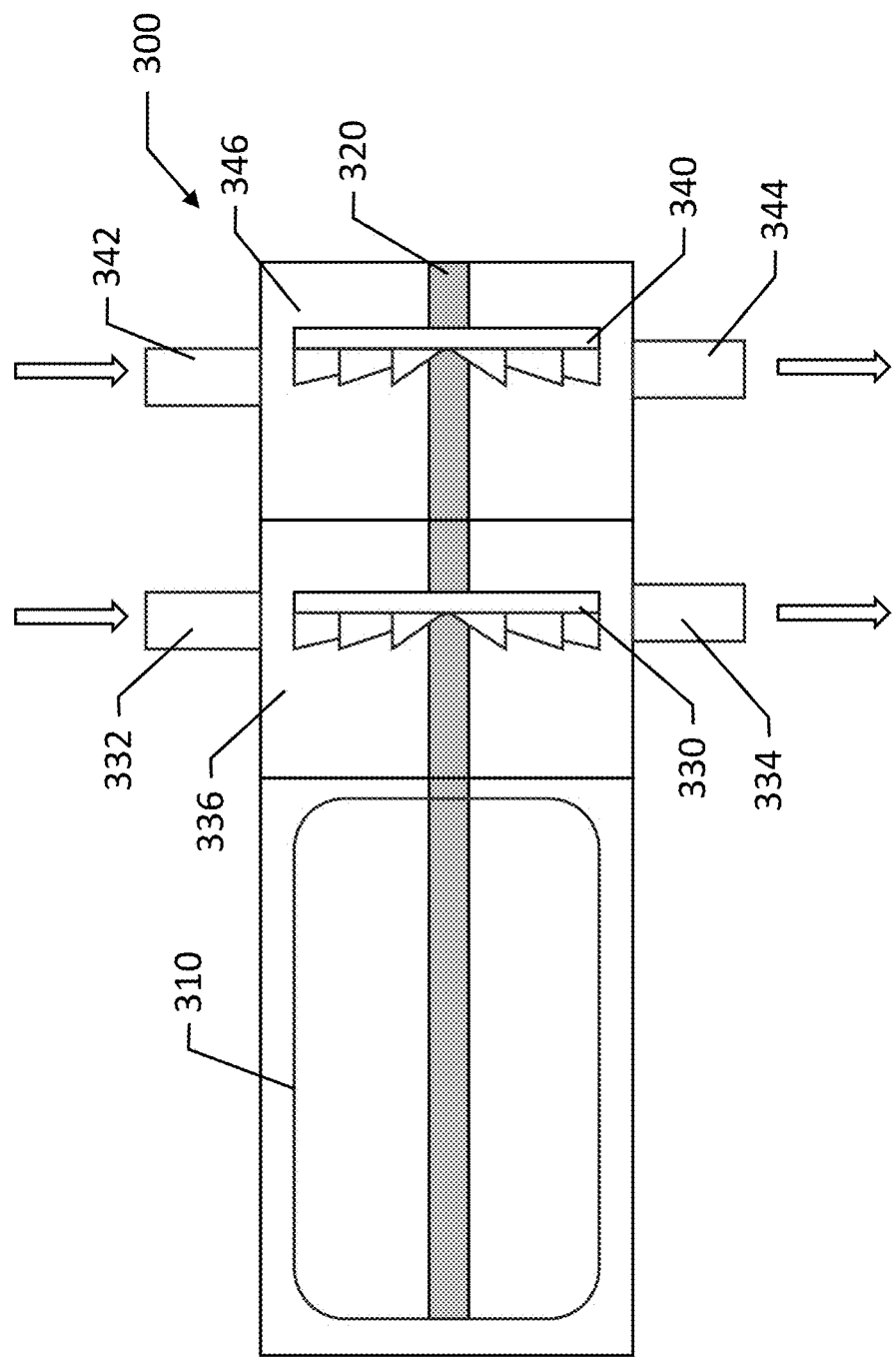
Figure 4:
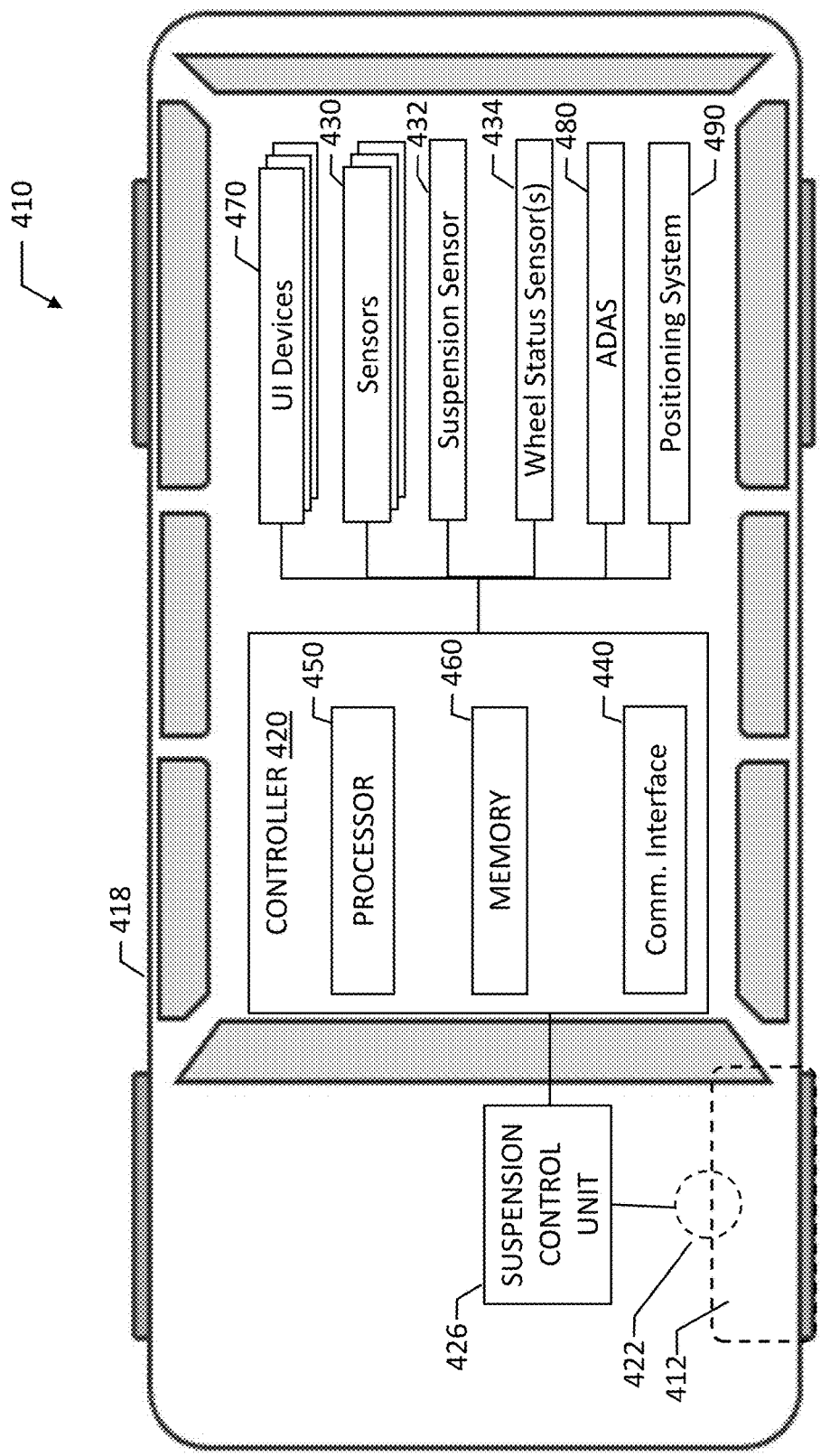

Having thus described certain example embodiments of the present disclosure in general terms, reference will hereinafter be made to the accompanying drawings which are not necessarily drawn to scale, and wherein:

FIG. 1 illustrates a schematic for a vehicle chassis employing active damper control according to an example embodiment of the present disclosure;

FIG. 2 illustrates a schematic for a vehicle chassis employing active damper control according to another example embodiment of the present disclosure;

FIG. 3 illustrates a section view of a pump having two distinct pump circuits according to an example embodiment of the present disclosure; and FIG. 4 illustrates a block diagram of a controller for a vehicle or subsystem thereof for fluid control system according to an example embodiment of the present disclosure.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Embodiments described herein generally relate to improving fluid control systems of a vehicle, and more specifically, to employing a fluid control system that reduces complexity of vehicle systems while employing a multi-function pump. The fluid control system described herein is employed for both active damper control and for circulation of oil within an oil circulation system of an internal combustion engine.

Advanced suspension systems are relatively complex but provide far superior capabilities than conventional vehicle suspension systems. One such advanced suspension system includes active damper control systems. While adaptive damper control can adjust a damping rate of a vehicle's shock absorbers, such as with the use of magnetorheological fluids and valving, active damper control can adjust damping rate and can be used to change a suspension height. Embodiments described herein relate to an active damper control system that multiplexes the system to supply oil to a powertrain of the vehicle.

Active damper controlled suspension systems in some embodiments generally include at least one fluid pump along with a fluid-filled damper as part of the suspension at each wheel. The fluid pump controls a volume of fluid and a pressure of the fluid in each of the fluid filled dampers to accommodate the selected suspension mode and to respond to sensor inputs to improve the ride of the vehicle and comfort of the passengers. FIG. 1 illustrates a simplified example embodiment of a system as described herein for adaptive damper control. As shown, each wheel 120 of a vehicle chassis 110 includes suspension components that at least include active dampers 130. According to the illustrated embodiment, a first fluid pump 140 is employed for the front wheels while a second fluid pump 150 is employed for the rear wheels. Each active damper 130 is connected to a fluid pump. The system of FIG. 1 also includes a fluid reservoir 160 that is in fluid communication with the first fluid pump 140 and the second fluid pump 150.

FIG. 2 illustrates an example embodiment of the fluid control system described herein. As shown, the system is illustrated associated with the vehicle chassis 210 including the four wheels 220. Each wheel is attached to the vehicle chassis 210 via suspension that includes at least one active damper 230 at each wheel 220. The system includes a first fluid pump 240 fluidically connected to the active dampers 230 of the front suspension. A second fluid pump 250 is fluidically connected to the active dampers 230 of the rear suspension. The first fluid pump 240 can be configured to supply fluid to the active dampers 230 of the front suspension independently or jointly. While embodiments depict two fluid pumps, some embodiments may employ a single fluid pump or in some cases three or more fluid pumps, such as a fluid pump for each individual wheel 220. Embodiments described herein can be employed regardless of how many pumps are employed in the active damper control system of the vehicle.

A valve control block 270 is configured to control fluid flow to and from the first fluid pump 240 and the second fluid pump 250, whereby the fluid control system includes fluid reservoir 260 that contains fluid for lubricating an internal combustion engine 280. The first fluid pump 240 includes at least two distinct fluid circuits that are isolated from one another, where a first fluid circuit of the first fluid pump 240 is in fluid communication with at least one active damper 230, while a second fluid circuit of the first fluid pump is employed to provide fluid to an oil circulation system of the internal combustion engine 280 by way of the valve control block 270.

An example embodiment of the first fluid pump is depicted in FIG. 3 in which a fluid pump 300 includes a pump motor 310 that drives a drive shaft 320. The drive shaft 320 is attached to a first impeller 330 of a first fluid circuit and a second impeller 340 of a second fluid circuit.

The first impeller 330 and the second impeller 340 are driven by the pump motor 310 turning the same drive shaft 320. The first fluid circuit includes an inlet 332 into the pump and an outlet 334, while the second fluid circuit includes an inlet 342 and an outlet 344. The first impeller 330 operates in a first chamber 336 while the second impeller 340 operates in a second chamber 346, keeping the fluid circuits distinct. This separation of the fluid circuits enables the fluids pumped in each distinct circuit to be different fluids if necessary, such as hydraulic fluid in the first fluid circuit and engine oil in the first fluid circuit and in the fluid reservoir 260.

The second fluid pump 250 of FIG. 2 may optionally be configured in the same manner as the first fluid pump 240 as described herein to reduce part complexity of the vehicle and for purposes of interchangeability. The first fluid pump 240 circulates fluid for the active dampers 230 of the front suspension via a first distinct pump circuit and between the fluid reservoir 260 and the internal combustion engine 280 using the valve control block 270 via a second distinct pump circuit. Similarly, the second fluid pump 250 circulates fluid for the active dampers 230 of the rear suspension via a first distinct pump circuit of the second fluid pump 250 and between the fluid reservoir 260 and the internal combustion engine 280 via the valve control block 270 using a second distinct pump circuit of the second fluid pump.

The first fluid pump 240, using the second distinct pump circuit, circulates fluid to and from the oil circulation system of the internal combustion engine 280 via the valve control block 270. Optionally, the second fluid pump 250, using the second distinct pump circuit, can also circulate fluid to and from the oil circulation system of the internal combustion engine 280. The second distinct pump circuit of the second fluid pump 250 may be a backup or redundant circuit to be employed in the event of a failure of the first fluid pump 240, for example. The valve control block 270, as commanded by a controller described further below, can determine a fluid flow path for the fluid from the second distinct pump circuit of the first fluid pump 240 and the second distinct pump circuit of the second fluid pump 250.

The controller can also control the valve control block 270 to only provide fluid to the oil circulation system of the internal combustion engine 280 under certain circumstances. For example, when the internal combustion engine 280 is running, fluid is needed by the engine such that the valve control block 270 is commanded to direct fluid to the oil circulation system of the internal combustion engine. When the engine is not running, oil may still be circulated to the oil circulation system under certain circumstances. For instance, when the oil temperature is elevated above a predefined temperature, the controller may control the valve control block 270 to circulate oil to the oil circulation system to help cool the oil faster by passing it through the engine to dissipate heat via the engine when the engine is cool and not running. In an instance in which the engine is off and the engine temperature is below a certain temperature, the controller may control the valve control block 270 to circulate oil to the oil circulation system of the internal combustion engine 280 to help warm the engine. This circulation may be performed before the engine is started which can help reduce wear of components within the internal combustion engine 280.

As another example, the controller may be configured to cause the valve control block 270 to cease to supply fluid to the oil circulation system of the internal combustion engine in response to detecting a pressure loss in the fluid circuit to the internal combustion engine 280. For example, the pressure within the fluid circuit may be monitored, such as by a pressure sensor, and the controller may be configured to supply fluid to the fluid circuit in an instance in which the pressure in the fluid circuit drops, such as by dropping by at least a predefined percentage or by a predetermined amount over a certain amount of time. The internal combustion engine 280 may also be commanded, such as by a vehicle controller, to cease running if there is a detected pressure loss in the fluid circuit from the oil reservoir 260 to the internal combustion engine 270. Ceasing operation of the engine can preclude damage in the event of an oil leak in the fluid circuit, while alerting a user of the vehicle of the pressure loss and the unavailability of the engine to supplement vehicle charging or propulsion.

In another embodiment, the controller may be configured to control the valve control block 270 to cause the fluid pump to change pressure in the oil circulation system of the internal combustion engine 280 in response to a rotational speed of the internal combustion engine. For example, the rotational speed of the internal combustion engine may be monitored and the controller may be configured to supply fluid to the oil circulation system in an instance in which the rotational speed of the internal combustion engine increases, such as by increasing by at least a predefined percentage or by a predetermined amount over a certain amount of time, or in an instance in which the rotational speed of the internal combustion engine exceeds a predetermined threshold rotational speed.

Employing the second distinct pump circuit of the first fluid pump 240 to provide fluid to the oil circulation system of the internal combustion engine 280 can allow the engine to be designed without need for an oil pump. This reduces the complexity of the internal combustion engine and reduces cost, while also removing a potential failure point of the engine. Further, having the ability to circulate oil within the engine while the engine is off provides benefits as described above to reduce wear on the engine.

The valve control block 270 described herein is controlled by a controller that ensures fluid is directed in the appropriate manner to supply the first fluid pump 240, second fluid pump 250, and the internal combustion engine 280. Further, the suspension system of the vehicle can also employ a controller to control the active dampers 230 at the suspension for each wheel. The controller may be embodied as a vehicle controller or a sub-unit controller of the vehicle, such as suspension system controller. FIG. 4 is a schematic diagram of an example embodiment of a vehicle 410 and a controller 420. The vehicle 410 is depicted with body 418 which generally encompasses the structure of the vehicle. The controller 420 of some embodiments is integrated into the vehicle 410 and connected to different elements described herein, such as through a wiring harness. The illustrated controller 420 can be embodied as any controller of the vehicle 410 for controlling any features of the vehicle 410, with the depicted features of the illustrated embodiment being optional depending upon the application. For example, as mentioned above, the controller 420 can be embodied as a suspension system controller; however, the present disclosure is not intended to be limiting in this regard.

According to some embodiments, the controller 420 could be a stand-alone controller or could be embodied via another vehicle controller, such as a vehicle control unit (VCU), an Advanced Driver Assistance System (ADAS) controller, an electronic control unit (ECU), or the like.

The controller 420 of FIG. 4 can be configured to perform any of the operations described herein. Controller 420 is an example embodiment that may be embodied by or associated with any of a variety of computing devices that include or are otherwise associated with a vehicle. The controller 420 can be in communication with any systems, sensors, or other controllers of the vehicle 410, such as via a communications interface (e.g., a CAN bus). According to some embodiments, the controller 420 can include a computing device that provides instructions or commands to a vehicle control module or other vehicle controller, where the controller is a device in communication with various vehicle systems and control architectures.

Optionally, the controller 420 may be embodied by or associated with a plurality of computing devices that are in communication with or otherwise networked with one another such that the various functions performed by the apparatus may be divided between the plurality of computing devices that operate in collaboration with one another.

The controller 420 may include, be associated with, or may otherwise be in communication with a communication interface 440, a processor 450, and a memory 460. The controller 420 may be in communication with one or more user interface devices 470, such as one or more displays that may include touch screen displays. In some embodiments, the processor 450 (and/or co-processors or any other processing circuitry assisting or otherwise associated with the processor) may be in communication with the memory 460 via a bus for passing information among components of the controller. The memory 460 may be non-transitory and may include, for example, one or more volatile and/or non-volatile memories. In other words, for example, the memory may be an electronic storage device (for example, a non-transitory computer readable storage medium) comprising gates configured to store data (for example, bits) that may be retrievable by a machine (for example, a computing device like the processor). The memory 460 may be configured to store information, data, content, applications, instructions, or the like for enabling the apparatus to carry out various functions in accordance with an example embodiment of the present disclosure. For example, the memory 460 could be configured to buffer input data for processing by the processor. Additionally or alternatively, the memory 460 could be configured to store instructions for execution by the processor.

The processor 450 may be embodied in a number of different ways. For example, the processor 450 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. In some embodiments, the processor 450 may include multiple processors configured in tandem via the bus to enable independent execution of instructions, pipelining and/or multithreading.

In an example embodiment, the processor 450 may be configured to execute instructions stored in the memory 460 or otherwise accessible to the processor. Alternatively or additionally, the processor 450 may be configured to execute hard coded functionality. As such, whether configured by hardware or software methods, or by a combination thereof, the processor 450 may represent an entity (for example, physically embodied in circuitry) capable of performing operations according to an embodiment of the present disclosure while configured accordingly. Thus, for example, when the processor 450 is embodied as an ASIC, FPGA or the like, the processor 450 may be specifically configured hardware for conducting the operations described herein.

Alternatively, as another example, when the processor 450 is embodied as an executor of software instructions, the instructions may specifically configure the processor 450 to perform the algorithms and/or operations described herein when the instructions are executed. However, in some cases, the processor 450 may be a processor of a specific device (for example, the computing device) configured to employ an embodiment of the present disclosure by further configuration of the processor by instructions for performing the algorithms and/or operations described herein.

As noted above, the controller 420 of an example embodiment may also include or otherwise be in communication with one or more user interface devices 470. The user interface devices 470 can include any feature of the vehicle 410 that a user interacts with including features such as climate control, infotainment interface, gauge cluster, etc. In this regard, the user interface devices 470 may include or otherwise be in communication with one or more displays, such as an infotainment system display, a gauge cluster, an entertainment system display (e.g., for rear seat passengers) or the like. The user interface devices 470 may optionally include one or more speakers, physical buttons, analog display (e.g., speedometer, fuel gauge, etc.) and/or other input/output mechanisms. The user interface devices 470 may be incorporated into the vehicle 410, such as a dedicated navigation system display/audio system or a device that can attach or associate with the vehicle via a communication link. In an example embodiment, the processor 50 may include user interface circuitry configured to control at least some functions of one or more input/output mechanisms. The processor 450 and/or user interface circuitry comprising the processor 450 may be configured to control one or more functions of one or more input/output mechanisms through computer program instructions (for example, software and/or firmware) stored on a memory accessible to the processor (for example, memory 460, and/or the like).

As shown, the vehicle 410 may be equipped with any number of sensors 430. As described herein, a "sensor" refers to any sensing device which can be used to determine properties of the environment of the vehicle 410, properties of the vehicle itself, forces applied from/to the vehicle, or the like. Accordingly, the sensors 430 can include, but are not limited to, image sensors, light distancing and ranging (LiDAR) sensors, wheel speed sensors, and/or tire pressure sensors, among various other types of sensors. For example, a sensor 430 can determine a speed of movement of the vehicle in some embodiments and/or an amount of torque required to rotate a wheel of the vehicle. In some embodiments, a sensor, such as wheel status sensor 434 can determine an amount of load at each wheel of a vehicle, such as through load carried by suspension components at each wheel. As another example, the wheel status sensor 434 can be embodied as a tire pressure sensor that can determine a current tire pressure of a tire of the vehicle. In some embodiments the wheel status sensor 434 can be embodied by a wheel speed sensor. Embodiments may optionally include a suspension sensor 432, whereby the suspension sensor can sense one or more properties of the suspension at each wheel. For example, the suspension sensor 432 can be embodied by a sensor that determines a suspension height, such as a proximity sensor or sensor that measures a distance between certain suspension components. In some embodiments including those with active damper control suspension, the suspension sensor 432 can be embodied by a pressure sensor to detect pressure of fluid in the damper.

It should be appreciated that the vehicle 410 may include a number of other sensors which may not be explicitly illustrated. For example, the vehicle 410 may include one or more of an accelerometer, a gyroscope, and a speed sensor to sense information regarding the movement, positioning, orientation, or inertial forces of the vehicle 410, e.g., for use in navigation assistance. In one such example, the vehicle 410 (or the controller 420 itself) could include an inertial measurement unit (IMU) that functions as an accelerometer and a gyroscope. The vehicle 410 may also include a light sensor, various image sensors (e.g., cameras), and more. The vehicle 410 may include various sensors and/or transceivers used for detecting a position, speed, etc. (e.g., for navigation) and/or for implementing various driving aids (e.g., parking sensors, radar for automatic cruise control and/or automated braking, cameras for lane center and object avoidance, etc.).

The controller 420 of an example embodiment may also optionally include a communication interface 440 that may be any means such as a device or circuitry embodied in either hardware or a combination of hardware and software that is configured to receive and/or transmit data from/to other electronic devices in communication with the controller 420. Additionally or alternatively, the communication interface 440 may be configured to communicate over any wired or wireless communication protocols. In some environments, the communication interface 440 may alternatively or additionally support vehicle to vehicle or vehicle to infrastructure wireless links.

The controller 420 of an example embodiment can be embodied by or otherwise be in communication with various other vehicle controllers which can be separate or in a single module; however, it will be appreciated that these controllers function in concert to enable various aspects of vehicle functionality. As such, the controller 420 can be interpreted as a general controller performing each of these functions to enable vehicle functionality accordingly.

As shown, the vehicle 410 can further include an advanced driver assistance system (ADAS) 480 configured to perform various driver-assistance functions of a vehicle, including control features that may be part of autonomous control of a vehicle, such as adaptive headlight aiming, adaptive cruise control, adaptive suspension control, lane departure warning and control, curve warning, and hazard warning, among others.

The ADAS 480 may be used to provide various functionality of a vehicle and may be implemented to improve the comfort, efficiency, safety, and overall satisfaction of driving. Some of these advanced driver assistance systems use a variety of sensors in the vehicle to determine the current state of the vehicle and the current state of the roadway ahead of the vehicle. These sensors may include radar, infrared, ultrasonic, and vision-oriented sensors such as image sensors and LiDAR sensors. According to some embodiments, and which may be particularly useful for an off-road capable vehicle, the sensors of an ADAS 480 can include, for example, various cameras such as cameras directed to the wheels and terrain proximate the wheels to help guide a driver/occupant with respect to how to navigate challenging off-road terrain. These cameras can be in the vehicle and/or around the exterior of the vehicle, such as in a wheel arch, fender flare, wing mirror, bumper, brush guard, etc.

The vehicle 410 can optionally include a positioning system 490 which may be in communication with controller 420 as shown in FIG. 4. The positioning system can include any type of Global Navigation Satellite Systems (GNSS) such as the Global Positioning System (GPS), BeiDou Navigation Satellite System (BDS) positioning system, Galileo positioning system, or any other standardized positioning system. The positioning system 490 can optionally include systems that are not satellite-based, but use other methods of localization, such as wireless access point triangulation or the like. The positioning system 490 can be used in conjunction with the ADAS 480 or user interface devices 470 such as a navigation system, for example. The positioning system 490, if employing a highly accurate localization technique, may be able to determine speed of movement of the vehicle and/or may otherwise be used to supplement other speed of movement determinations (e.g., using wheel speed sensors).

FIG. 4 further includes an illustration of suspension components of a wheel 412 of the vehicle. As shown, the suspension can include a suspension element 422 which can include a shock absorber, a spring, a coil over shock, or in some embodiments an active damper as described herein. As noted above, an active damper controlled suspension is suspension that relies on pressure in a damper that functions as a shock absorber and may supplement a conventional spring or be used in conjunction with an air suspension, for example. Active dampers can be height adjustable based on a pressure within the damper. To increase or decrease air pressure within a damper, a fluid pump may be used and controlled by a controller and a reservoir may be employed to store fluid that is pumped into and out of the damper. The controller and/or the fluid pump can be embodied by the illustrated suspension control unit 426.

The fluid control system described herein can be employed with any type of powertrain. The powertrain of a vehicle, as described herein, includes a drive system, which enables power to be provided to the driven wheels of the vehicle. The powertrain can be that of (i) a conventional internal combustion engine (including gears, driveshafts, etc.), (ii) a hybrid-electric vehicle employing both an internal combustion engine and electric motors, or (iii) a purely electric vehicle employing electric motors for the powertrain.

Embodiments of the present disclosure provide significant advantages over prior conventional systems. For example, complexity of the vehicle is reduced by employing a single fluid pump for both the active damper suspension and the internal combustion engine which enables more efficient and effective packaging. While a conventional ICE oil pump is driven by the engine, embodiments described herein can drive the pump when the engine is not running allowing for cooling of the engine oil. Further, in an embodiment in which the same fluid is used for the engine and the active damper control, a cool engine can be used to cool the fluid used in the suspension. Optionally, already warmed fluid in the suspension could be supplied to the engine in such a scenario to warm the engine before starting the engine. Keeping the engine warmer improves engine efficiency and can reduce emissions.

The valve control block of an example embodiment can enable the controller to determine to circulate fluid to the ICE and the active dampers of the rear suspension with a pump proximate the rear suspension for an ICE mounted in the rear, to circulate fluid to the ICE and the active dampers of the front suspension with a pump proximate the front suspension for an ICE mounted in the front, and to enable a single fluid pump to be used for both front and rear suspension with the second fluid pump reserved for redundancy. If a damper fails and/or leaks, that circuit can be detected by a pressure drop and fluid flow in that circuit can be stopped. This can enable the fluid flow to the engine to continue. The fluid pumps of example embodiments can optionally be used to pump fluid from the system, such as via an evacuation valve, to facilitate fluid changes in some embodiments.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the embodiments set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A vehicle comprising:
    a fluid pump, wherein the fluid pump comprises at least two distinct pump circuits including first and second distinct pump circuits;
    a valve control block; and
    at least one fluid damped suspension damper, wherein the first distinct pump circuit of the fluid pump is in fluid communication with the at least one fluid damped suspension damper,
    wherein the second distinct pump circuit of the fluid pump is in fluid communication via the valve control block with an oil circulation system of an internal combustion engine.

2. The vehicle of claim 1, wherein the fluid pump is a first fluid pump, wherein the at least one fluid damped suspension damper comprises a first pair of fluid damped suspension dampers and a second pair of fluid damped suspension dampers, the vehicle further comprising:
    a second fluid pump, wherein the first fluid pump is in fluid communication with the first pair of fluid damped suspension dampers, and wherein the second fluid pump is in fluid communication with the second pair of fluid damped suspension dampers.

3. The vehicle of claim 2, wherein the second fluid pump comprises at least two distinct pump circuits including a first distinct pump circuit and a second distinct pump circuit, the first distinct pump circuit of the second fluid pump being in fluid communication with the second pair of fluid damped suspension dampers;
    wherein the second distinct pump circuit of the second fluid pump is in fluid communication via the valve control block with the oil circulation system of the internal combustion engine.

4. The vehicle of claim 3, further comprising a controller configured to control the valve control block, wherein the controller is configured to control the valve control block to provide fluid from the second distinct pump circuit of the first fluid pump to the oil circulation system of the internal combustion engine.

5. The vehicle of claim 4, wherein the controller is configured to control the valve control block to provide fluid from the second distinct pump circuit of the second fluid pump to the oil circulation system of the internal combustion engine in response to a failure of the first fluid pump.

6. The vehicle of claim 1, further comprising a controller configured to control the valve control block, wherein the controller is configured to cause the valve control block to cease to supply fluid to the oil circulation system of the internal combustion engine in response to detecting a pressure loss in a fluid circuit.

7. The vehicle of claim 1, further comprising a controller configured to control the valve control block, wherein the controller is configured to cause the fluid pump to change pressure in the oil circulation system of the internal combustion engine in response to a rotational speed of the internal combustion engine.

8. The vehicle of claim 1, further comprising a controller configured to control the valve control block, wherein the controller is configured to cause fluid to be circulated in the oil circulation system of the internal combustion engine in response to the internal combustion engine running and cease to circulate fluid in the oil circulation system of the internal combustion engine in response to the internal combustion engine not running.

9. The vehicle of claim 1, further comprising a controller configured to control the valve control block, wherein the controller is configured to cause fluid to be circulated in the oil circulation system of the internal combustion engine based on a temperature of the internal combustion engine.

10. The vehicle of claim 1, wherein a fluid circulated in the first distinct pump circuit is different than a fluid circulated in the second distinct pump circuit.

11. A fluid control system comprising:
    a first fluid pump, wherein the first fluid pump comprises at least two distinct pump circuits including first and second distinct pump circuits;
    a second fluid pump;
    a valve control block;
    a first pair of fluid damped suspension dampers, wherein the first distinct pump circuit of the first fluid pump is in fluid communication with the first pair of fluid damped suspension dampers; and
    a second pair of fluid damped suspension dampers, wherein the second fluid pump is in fluid communication with the second pair of fluid damped suspension dampers;
    wherein the second distinct pump circuit of the first fluid pump is in fluid communication via the valve control block with an oil circulation system of an internal combustion engine.

12. The fluid control system of claim 11, wherein the second fluid pump comprises at least two distinct pump circuits including a first distinct pump circuit and a second distinct pump circuit, wherein the second pair of fluid damped suspension dampers are in fluid communication with the first distinct pump circuit of the second fluid pump, and wherein the second distinct pump circuit of the second fluid pump is in fluid communication via the valve control block with the oil circulation system of the internal combustion engine.

13. The fluid control system of claim 12, further comprising a controller configured to control the valve control block to provide fluid from the second distinct pump circuit of the second fluid pump to the oil circulation system of the internal combustion engine in response to a failure of the first fluid pump.

14. The fluid control system of claim 11, further comprising a controller configured to control the valve control block, wherein the controller is configured to cause the valve control block to cease to supply fluid to at least one fluid damped suspension damper or the oil circulation system of the internal combustion engine in response to detecting a pressure loss in a fluid circuit.

15. The fluid control system of claim 11, further comprising a controller configured to control the valve control block, wherein the controller is configured to cause the first fluid pump to change pressure in the oil circulation system of the internal combustion engine in response to a rotational speed of the internal combustion engine.

16. The fluid control system of claim 11, further comprising a controller configured to control the valve control block, wherein the controller is configured to cause fluid to be circulated in the oil circulation system of the internal combustion engine in response to the internal combustion engine running and cease to circulate fluid in the oil circulation system of the internal combustion engine in response to the internal combustion engine not running.

17. The fluid control system of claim 11, further comprising a controller configured to control the valve control block, wherein the controller is configured to cause fluid to be circulated in the oil circulation system of the internal combustion engine based on a temperature of the internal combustion engine.

18. The fluid control system of claim 11, wherein a fluid circulated in the first distinct pump circuit is different than a fluid circulated in the second distinct pump circuit.

19. The fluid control system of claim 11, wherein the first distinct pump circuit comprises a first impeller and the second distinct pump circuit comprises a second impeller, wherein the first and second impellers are coaxial and driven by a single pump motor.

* * * * *